(12) United States Patent
Ariga (10) Patent No.: US 7,090,415 B2
(45) Date of Patent: Aug. 15, 2006

(54) IMAGE-TAKING APPARATUS (75) Inventor: Kazuto Ariga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/287,909

(22) Filed: Nov. 28, 2005

(65) Prior Publication Data
US 2006/0078326 A1  Apr. 13, 2006

Related U.S. Application Data (62) Division of application No. 10/830,342, filed on Apr. 22, 2004, now Pat. No. 7,004,648.

(30) Foreign Application Priority Data

Apr. 28, 2003  (JP) ............................ 2003-123305

(51) Int. Cl.
*G03B 17/02* (2006.01)
(52) U.S. Cl. ...................... 396/419; 396/535
(58) Field of Classification Search ............... 396/155, 396/267, 388, 419, 428, 535; 348/373, 375, 348/376
See application file for complete search history.

(56) References Cited

U.S. PATENT DOCUMENTS 5,467,157 A   11/1995  Kaneko ...................... 396/428

FOREIGN PATENT DOCUMENTS

JP       57-79929        5/1982
JP    H14(2002)-006381   1/2002

*Primary Examiner*—W. B. Perkey
(74) *Attorney, Agent, or Firm*—Cowan, Liebowitz & Latman, P.C.

(57) ABSTRACT

An image-taking apparatus capable of mounting an accessory, which is small-sized yet capable of securing a sufficient inner volume is disclosed. The image-taking apparatus includes a first member having a female screw hole portion into which a male screw portion provided in the accessory is inserted, a main chassis to which the first member is fixed and a second member which covers an opening of the female screw hole portion opposite to the insertion side of the male screw portion. The female screw hole portion is a hole portion penetrating the first member and the second member prevents the male screw portion from further going in by the tip of the male screw portion inserted into the female screw hole portion contacting the second member.

5 Claims, 7 Drawing Sheets

(PRIOR ART)

FIG. 10

(PRIOR ART)

IMAGE-TAKING APPARATUS

CROSS-REFERENCE TO RELATED APPLICATIONS

This application is a divisional of application Ser. No. 10/830,342, filed Apr. 22, 2004 now U.S. Pat. No. 7,004,648, the entire disclosure of which is hereby incorporated by reference.

BACKGROUND OF THE INVENTION

1. Field of the Invention

The present invention relates to an image-taking apparatus to which an accessory such as a tripod can be attached, and more particularly, to a structure which attaches an accessory.

2. Description of the Related Art

Through the realization of low running cost by a recording/reproducing function using a recording medium and size and weight reductions, the demand for a digital still camera is growing in recent years. On the other hand, the bottom face of a camera is provided with a mounting member to mount a tripod and a screw hole portion is formed in this mounting member to screw in a screw portion provided on the tripod.

Figure 9:
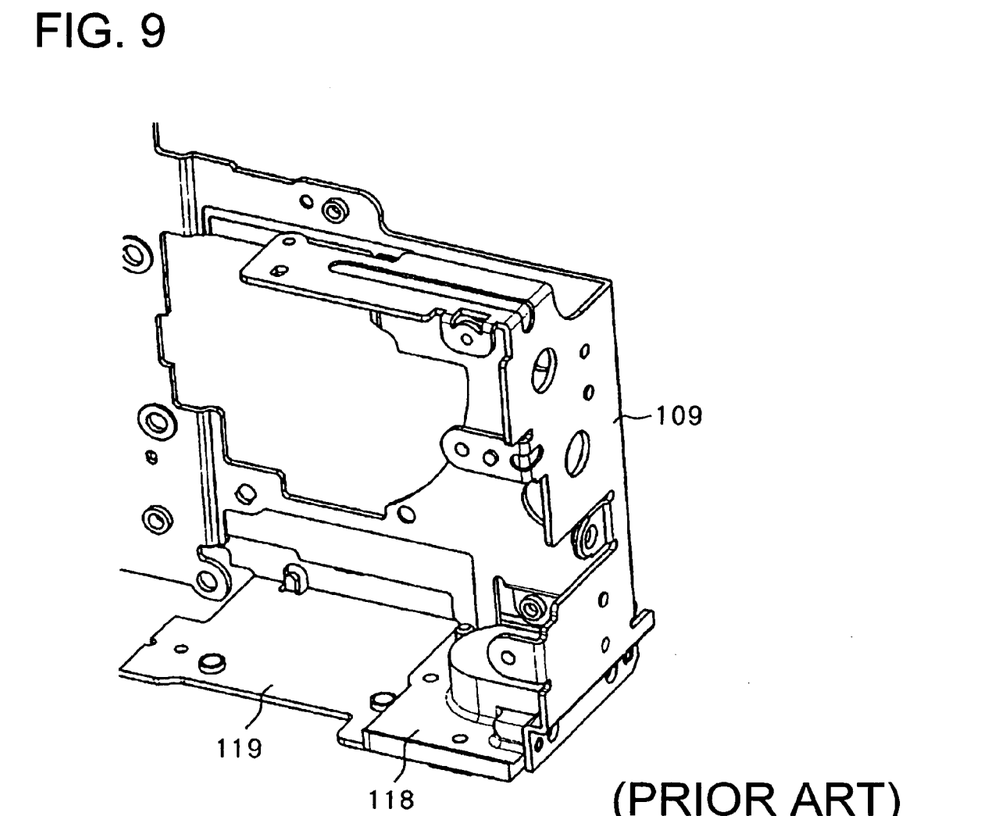
FIG. 9 is a schematic perspective view of a main chassis of a conventional camera.
Figure 10:
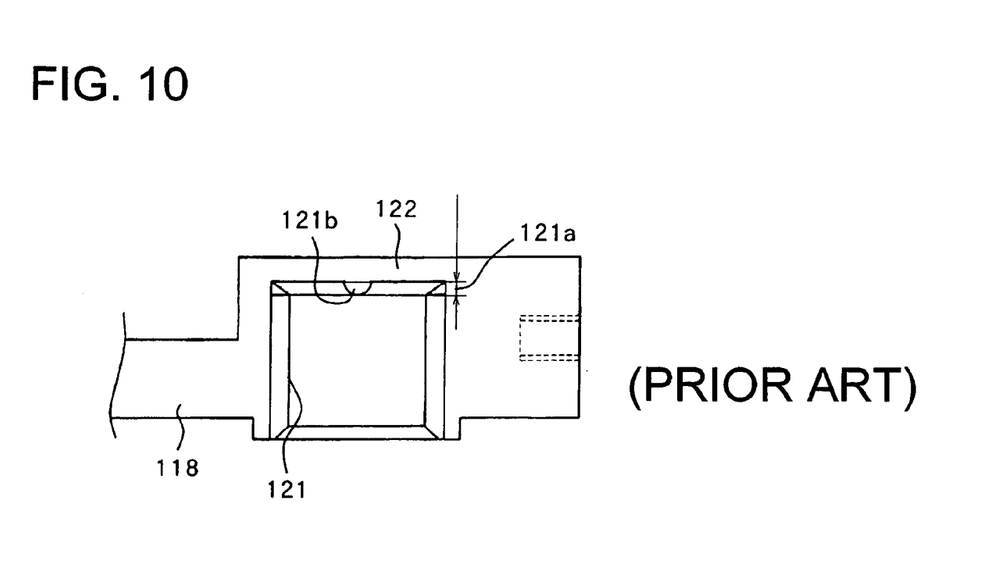
FIG. 10 is a schematic cross-sectional view of a mounting member of a conventional camera.

This mounting member is disclosed in Japanese Patent Application Laid-Open No. H14(2002)-006381 and the structure is shown in FIG. 9 and FIG. 10. Here, FIG. 9 shows the mounting member attached to a main chassis which is an internal structure of a camera and FIG. 10 is a cross-sectional view in the thickness direction of the mounting member.

A mounting member 118 is fixed to a main chassis 109, a bottom plate 119 and a front cover and a rear cover (not shown) which constitute the exterior of the camera by using screws. The main chassis 109 is constructed of a thin steel sheet in consideration of size and weight reductions.

As shown in FIG. 10, a screw hole portion 121 is formed in the mounting member 118 and the camera is fixed to the tripod by screwing a screw portion (not shown) provided for the tripod into this screw hole portion 121.

Here, since the screw hole portion 121 is formed by screwing a tap into a concave section provided in the mounting member 118, the area of a screw groove formed near the bottom of this concave section becomes an incomplete screw portion 121a. Therefore, when the screw portion of the tripod is screwed into the screw hole portion 121, this screw portion may be caught in the incomplete screw portion 121a, making it difficult to remove the screw portion from the mounting member 118.

Thus, a semi-spherical protrusion 121b having substantially the same height as that of the area in which the incomplete screw portion 121a is formed is provided on the bottom face of the concave section beforehand to prevent the screw portion of the tripod from going into the incomplete screw portion 121a. That is, when the screw portion of the tripod is screwed into the screw hole portion 121, the tip of this screw portion touches the protrusion 121b preventing the screw portion from further going into the incomplete screw portion 121a.

Furthermore, there is conventionally a proposal on a camera provided with a contact section called a "hot shoe" at the top of the camera body so as to mount an external electronic flash on this contact section.

Furthermore, there is a proposal on a camera provided with a remote control reception section inside the camera body to allow various remote control operations by remote control.

However, when a normal tap is used, a tip of the tap touches the protrusion 121b which makes it difficult to machine the necessary screw portion. For this reason, it is necessary to form the screw hole portion 121 using a special tap to avoid interference with the protrusion 121b, but using the special tap may increase the machining cost.

Furthermore, the thickness of the mounting member 118 is the sum of the screw hole portion 121, protrusion 121b and ceiling section 122, which may not only narrow the internal volume of the camera but also increase the size of the camera.

Moreover, when an external electronic flash is mounted on the camera as described above, it is necessary to increase the thickness of the area peripheral to the contact section to support the electronic flash, which may increase the size of the camera.

Furthermore, when a remote control reception section is provided inside the camera body, it is necessary to secure a space to place this remote control reception section, which may increase the size of the camera.

SUMMARY OF THE INVENTION

It is a first object of the present invention to provide an image-taking apparatus miniaturized while securing the internal volume. Furthermore, it is a second object of the present invention to provide an image-taking apparatus capable of communicating with an accessory without increasing the size of the apparatus body.

An image-taking apparatus which is one aspect of the present invention allows an accessory to be mounted and comprises a first member including a female screw hole portion into which a male screw portion provided in the accessory is inserted, a main chassis of the image-taking apparatus to which the first member is fixed and a second member which covers an opening of the female screw hole portion opposite to the insertion side of the male screw portion. Here, the female screw hole portion is a hole portion penetrating the first member and the second member prevents the male screw portion from further going in by a tip of the male screw portion inserted into the female screw hole portion contacting the second member.

The features of the image-taking apparatus of the invention will become more apparent from the following detailed description of a preferred embodiment of the invention with reference to the drawings.

DETAILED DESCRIPTION OF THE PREFERRED EMBODIMENTS

With reference now to the attached drawings, embodiments of the present invention will be explained below.

Embodiment 1

Figure 1:
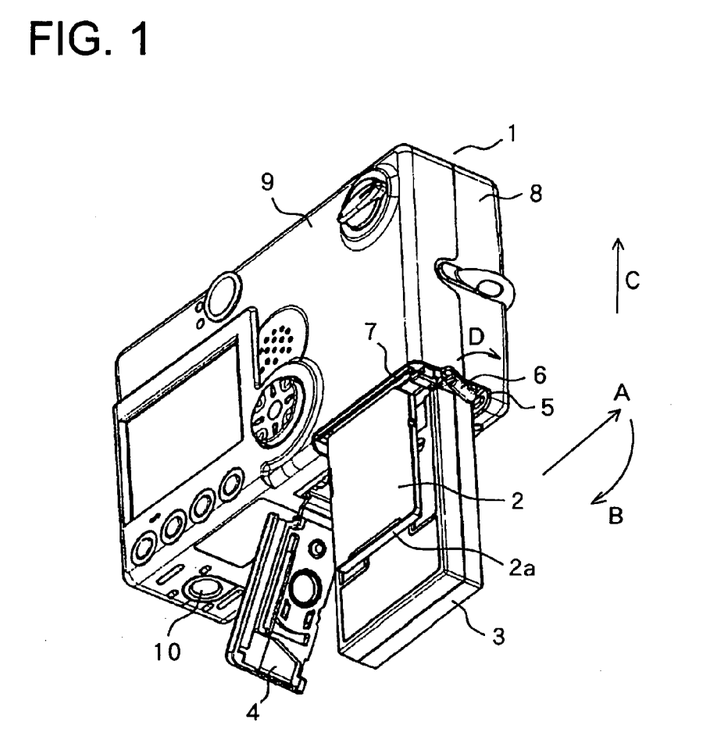
FIG. 1 is a schematic perspective view of an image-taking apparatus, which is a first embodiment of the present invention.

FIG. 1 is a bottom perspective view of a camera (image-taking apparatus) 1 which is Embodiment 1 of the present invention. In the same figure, reference numeral 2 denotes an SD memory card (hereinafter abbreviated as "SD card") to store image data. This SD card 2 is housed in an SD slot 7 provided at the bottom of the camera 1.

Furthermore, a battery chamber 5 is provided at the bottom of the camera 1 adjacent to the SD slot 7 and this battery chamber 5 houses a battery 3.

Reference numeral 4 denotes a bottom cover to cover the opening members of the SD slot 7 and battery chamber 5 and protect the SD card 2 and battery 3 and this bottom cover 4 forms a part of the exterior of the camera 1. Reference numeral 6 denotes a battery lock to lock the battery 3 housed in the battery chamber 5 and this battery lock 6 is constructed of a resin member and supported near the opening of the battery chamber 5 in a rotatable manner.

Reference numeral 8 denotes a front cover which constitutes the front side of the exterior of the camera 1. Reference numeral 9 denotes a rear cover which constitutes the rear side of the exterior of the camera 1. The front cover 8 and rear cover 9 are made of metal. Reference numeral 10 denotes a mounting member (first member) to mount a tripod 50 (accessory) shown in FIG. 7, details of which will be described later.

Then, the procedure which takes the SD card 2 out of the SD slot 7 will be explained using FIG. 1.

When the SD card 2 is taken out, the bottom cover 4 is slid in the direction indicated by arrow A first and then turned in the direction indicated by arrow B as shown in FIG. 1.

Then, an end face 2a of the SD card 2 is pushed in the direction indicated by arrow C to cancel the engagement between the SD slot 7 and an ejection spring (not shown) provided on the bottom face of the SD slot 7. When the engagement is canceled, the SD card 2 is ejected from the SD slot 7 by a spring force of the ejection spring.

When the SD card 2 is inserted into the SD slot 7, SD card 2 can be pushed in the direction indicated by arrow C as in the case of taking out the SD card 2 described above. This causes the ejection spring to engage with the SD slot 7 and the SD card 2 is housed in the SD slot 7.

Figure 3:
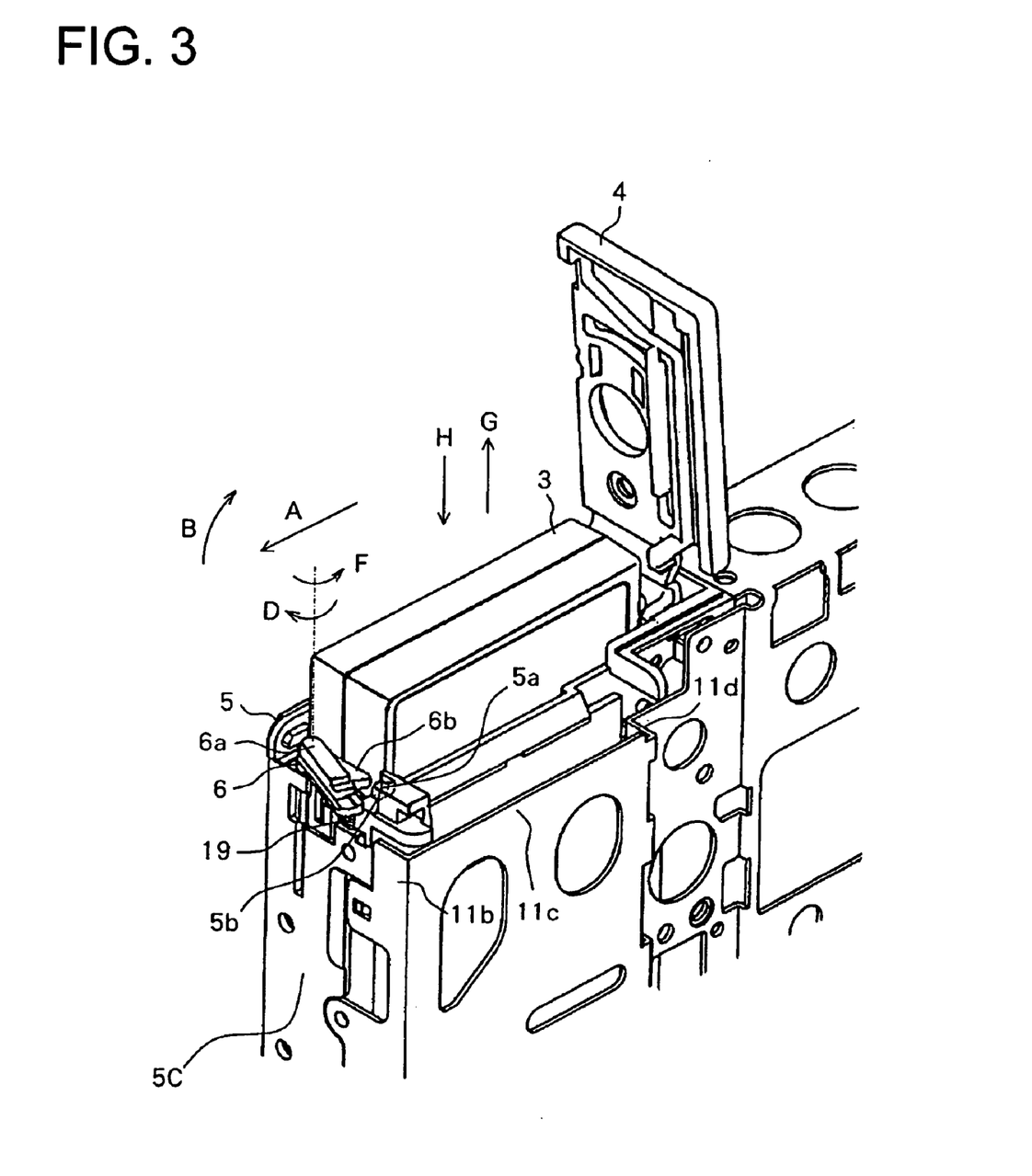
FIG. 3 is a schematic perspective view (enlarged view) of the image-taking apparatus.

Then, the procedure which takes the battery 3 out of the battery chamber 5 will be explained using FIG. 1 and FIG. 3. FIG. 3 is a bottom perspective view of the camera 1.

First, as in the case of taking out the SD card 2, the bottom cover 4 is slid in the direction indicated by arrow A and turned in the direction indicated by arrow B as shown in FIG. 1.

Then, by hooking a finger on a convex operation section 6a formed in the battery lock 6 and turning the battery lock 6 in the direction indicated by arrow D, the locking of the battery 3 by the battery lock 6 is unlocked. Here, the battery lock 6 is pushed by a spring 19 in the direction indicated by arrow F.

When the locking of the battery 3 is unlocked, the battery 3 receives a spring force of an ejection spring (not shown) provided in the battery chamber 5 and is ejected from the battery chamber 5.

Figure 2:
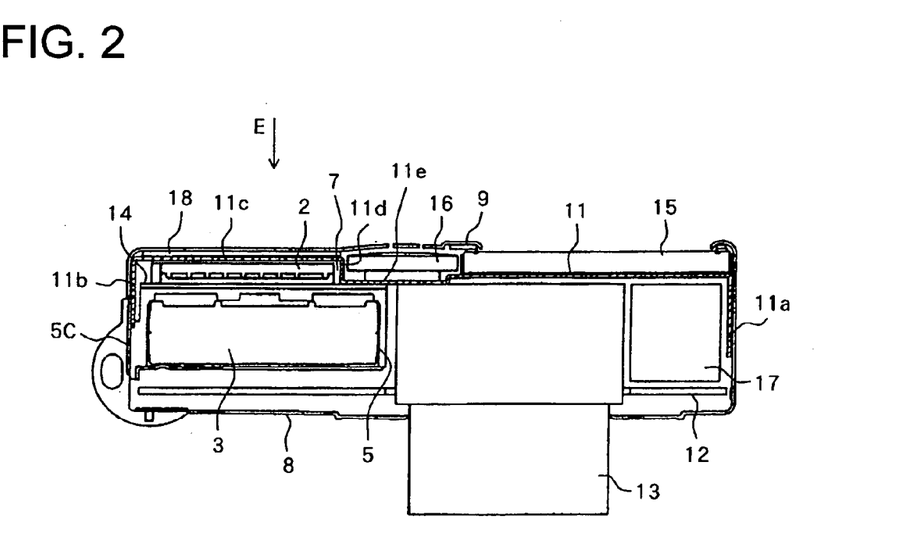
FIG. 2 is a schematic cross-sectional view of the above described image-taking apparatus.

Then, the structure of the camera 1 will be explained using FIG. 2. FIG. 2 is a schematic cross-sectional view of the camera 1 in the direction of the optical axis. Reference numeral 11 denotes a main chassis which is an internal structure of the camera 1 and this main chassis 11 is constructed of a thin steel sheet for size and weight reductions.

Reference numeral 12 denotes a signal processing substrate and 13 denotes a lens barrel in which an image-pickup device (not shown) (e.g., CCD, CMOS sensor) and image-taking lens, etc., are incorporated. This lens barrel 13 moves forward or backward in the direction of the optical axis to thereby change the focal length of the image-taking optical system. Reference numeral 14 denotes a power supply circuit substrate on which the SD slot 7 is mounted and 15 denotes a liquid crystal panel which displays an image taken by the image-pickup device, etc.

Reference numeral 16 denotes a speaker which outputs an operation sound such as a shutter sound and is also used to reproduce speech, 17 denotes a barrel drive circuit which drives the lens barrel 13 and 18 denotes an R inner made of resin and adhered and fixed to the rear cover 9.

The main chassis 11 includes bent sections 11a, 11b and 11c, and of these bent sections 11a to 11c, the bent sections 11a and 11b located at both ends are fixed to the front cover 8 and rear cover 9 using screws (not shown).

The battery chamber 5 is fixed to the main chassis 11 using a screw (not shown) and at the same time fixed to the front cover 8 and rear cover 9 on an end face 5c using screws (not shown).

Thus, the main chassis 11 has three bent sections 11a, 11b and 11c, and therefore the main chassis 11 is not likely to have strength-related problems even if its thickness is reduced.

Furthermore, since the bent sections 11a and 11b at both ends of the main chassis 11 are fixed to the front cover 8 and rear cover 9 which constitute the exterior, the main chassis 11 has a structure resistant to bending forces in the central area of the main chassis 11 and stress (external forces) applied to the right and left sides of the camera 1.

The SD slot 7 which is the housing of the SD card 2 and battery armature (not shown) of the battery chamber 5 are soldered to the power supply circuit substrate 14 and this power supply circuit substrate 14 is fixed to the battery chamber 5. By attaching the SD slot 7 to the strong battery chamber 5 through the power supply circuit substrate 14 in this way, it is possible to firmly fix the SD slot 7.

Furthermore, a power supply GND pattern (pattern to which the battery armature (not shown) contacting the GND terminal of the battery 3 is soldered) provided on the power supply circuit substrate 14 is electrically connected to the main chassis 11 through the bent section 11e. This causes the main chassis 11, front cover 8 and rear cover 9 to have the GND potential, which makes it possible to reduce static electricity, reduce noise and improve the shielding effects against electromagnetic waves.

The side of the SD slot 7 facing the back of the camera 1 is surrounded by the bent sections 11b, 11c, 11d of the main chassis 11. This allows image data stored in the SD card 2 to be protected from mechanical stress (for example, external pressures applied from the direction indicated by arrow E in FIG. 2) and electric stress (for example, static electricity).

There is a space between the liquid crystal panel 15 and the SD slot 7 and the speaker 16 is placed in this space. This allows the space formed in the camera 1 to be used effectively, contributing to miniaturization of the camera 1.

Then, the movements of the battery lock 6 and bottom cover 4 when an external force is applied such as when the user drops the camera by mistake will be explained using FIG. 3, FIG. 4 and FIG. 5.

Figure 4:
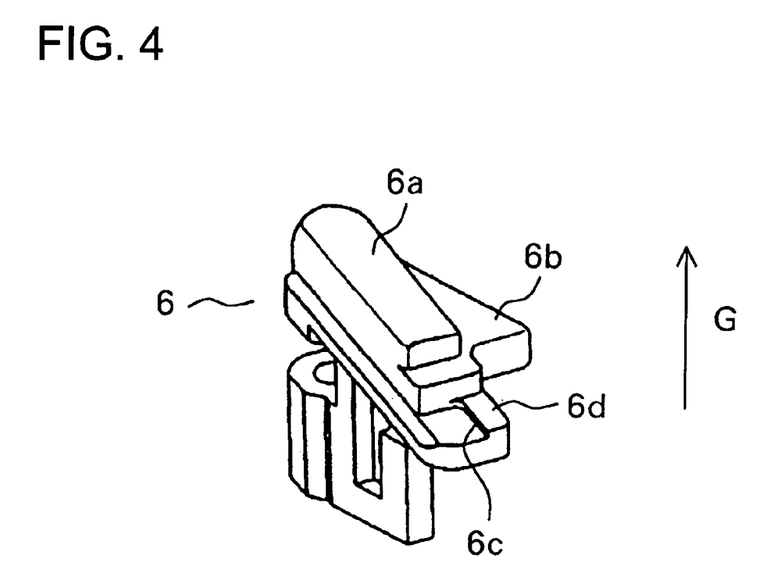
FIG. 4 is a schematic perspective view of a battery lock in the image-taking apparatus.
Figure 5:
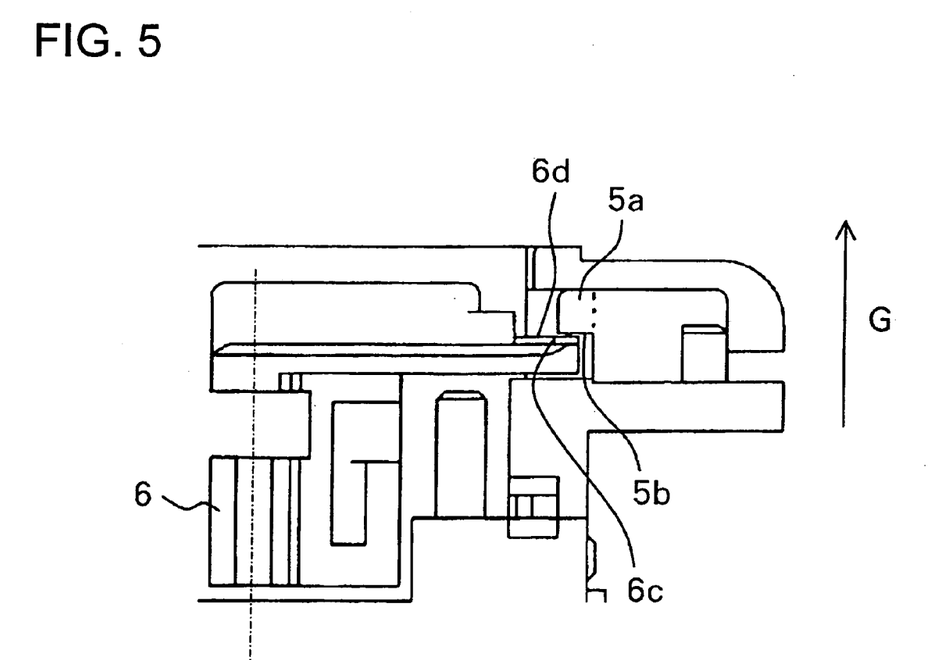
FIG. 5 is a schematic cross-sectional view of the battery lock and the area peripheral thereto.

Here, FIG. 4 is an external perspective view of the battery lock 6 and FIG. 5 is a cross-sectional view in the vertical direction of the camera 1 showing the structure of the battery lock 6 and the battery chamber 5 peripheral thereto.

A stepped stopper 6c protruding in the direction indicated by arrow G (vertical direction of the camera 1) is formed on the top surface of the battery lock 6. By this stopper 6c contacting an end face 5a formed in the battery chamber 5 substantially parallel to the direction indicated by arrow G, it is possible to prevent the battery lock 6 from turning in the direction indicated by arrow D.

That is, when a shock is applied to the camera 1 and the battery 3 moves from the position at which it is housed in the direction indicated by arrow G, the battery lock 6 contacting the battery 3 is lifted from the position shown in FIG. 5 in the direction indicated by arrow G. This causes the stopper 6c to move to a position where it overlaps the end face 5a of the battery chamber 5. That is, the top face 6d of the stopper 6c is located at a position, which is higher than the end face 5b of the battery chamber 5 as shown in FIG. 5.

At this time, since there is a gap in the direction indicated by arrow D in FIG. 3 (direction perpendicular to the plane of the sheet in FIG. 5) between the stopper 6c and the end face 5a of the battery chamber 5, the battery lock 6 may turn in the direction indicated by arrow D due to a shock in the case of a drop, etc., but the stopper 6c is prevented from turning by contacting the end face 5a of the battery chamber 5.

Here, since the amount of rotation of the battery lock 6 is minimal, there is almost no possibility that the battery lock 6 turning in the direction indicated by arrow D may touch the bottom cover 4, causing the bottom cover 4 to slide in the direction indicated by arrow A. Therefore, when a shock is applied to the camera 1 by a drop, etc., it is possible to prevent the bottom cover 4 from opening, causing the battery 3 to pop out of the battery chamber 5.

During normal use, there is almost no possibility that the battery lock 6 may receive a force from the battery 3 bending in the direction indicated by arrow G as shown above, and as shown in FIG. 5, there is a gap of approximately 0.2 mm between the end face 5b of the battery chamber 5 substantially parallel to the bottom face of the camera 1 and the top face 6d of the stopper 6c. That is, the stopper 6c is normally supposed not to touch the end face 5a of the battery chamber 5.

Here, when the user turns the battery lock 6 in the direction indicated by arrow D by hooking a finger on the operation section 6a of the battery lock 6 to take out the battery 3, the battery lock 6 is pushed down by the user's finger and bent in the direction indicated by arrow H.

This causes the gap between the end face 5b and the top face 6d (gap of the camera 1 in the vertical direction) to become greater than 0.2 mm, and it is thereby possible to prevent interference between the battery lock 6 and battery chamber 5 sufficiently and smoothly turn the battery lock 6 in the direction indicated by arrow D.

Figure 6:
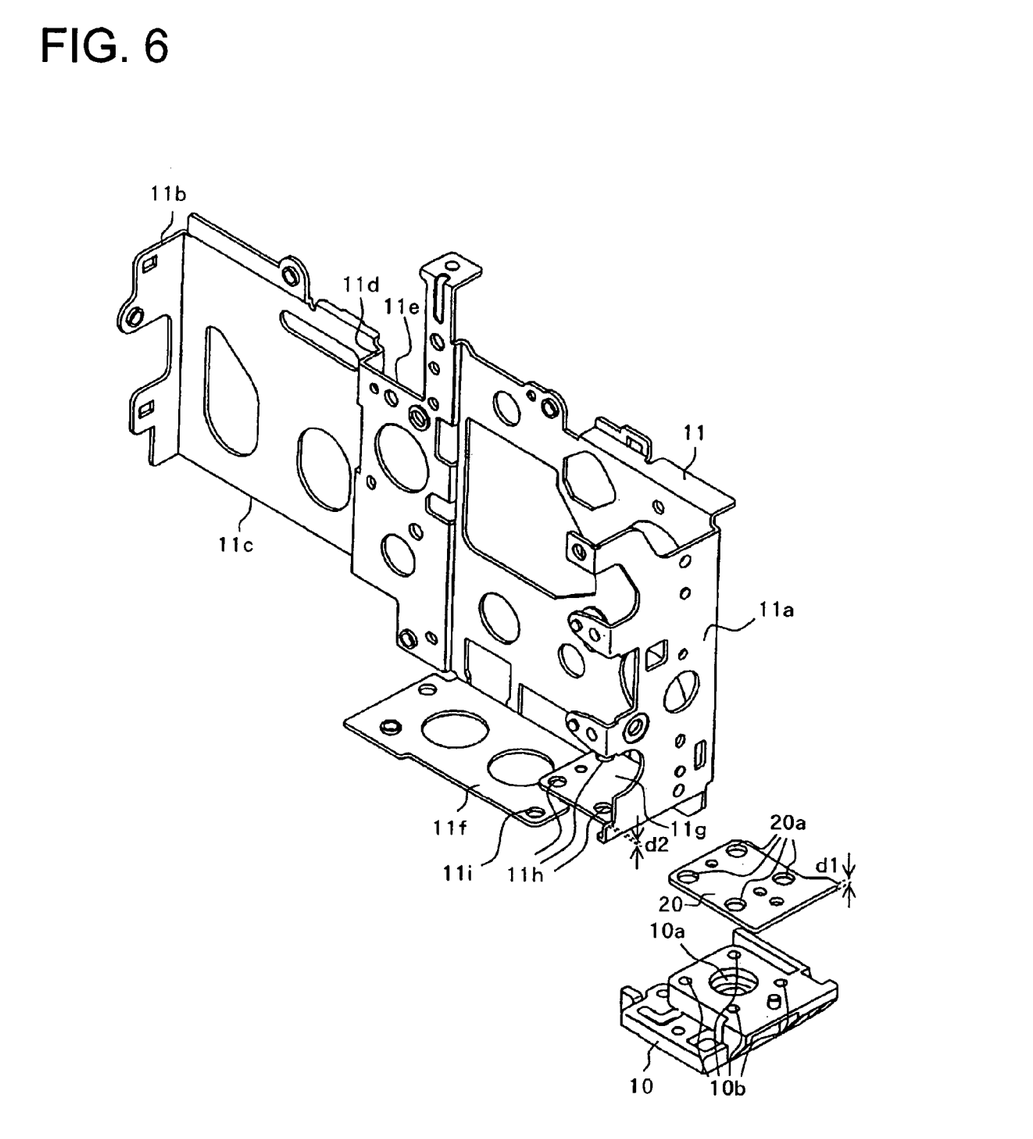
FIG. 6 is a schematic perspective view of the main chassis in the first embodiment of the present invention.

Then, the mounting member of this embodiment will be explained using FIG. 6. FIG. 6 is a schematic perspective view illustrating the structure of the mounting member.

Figure 7:
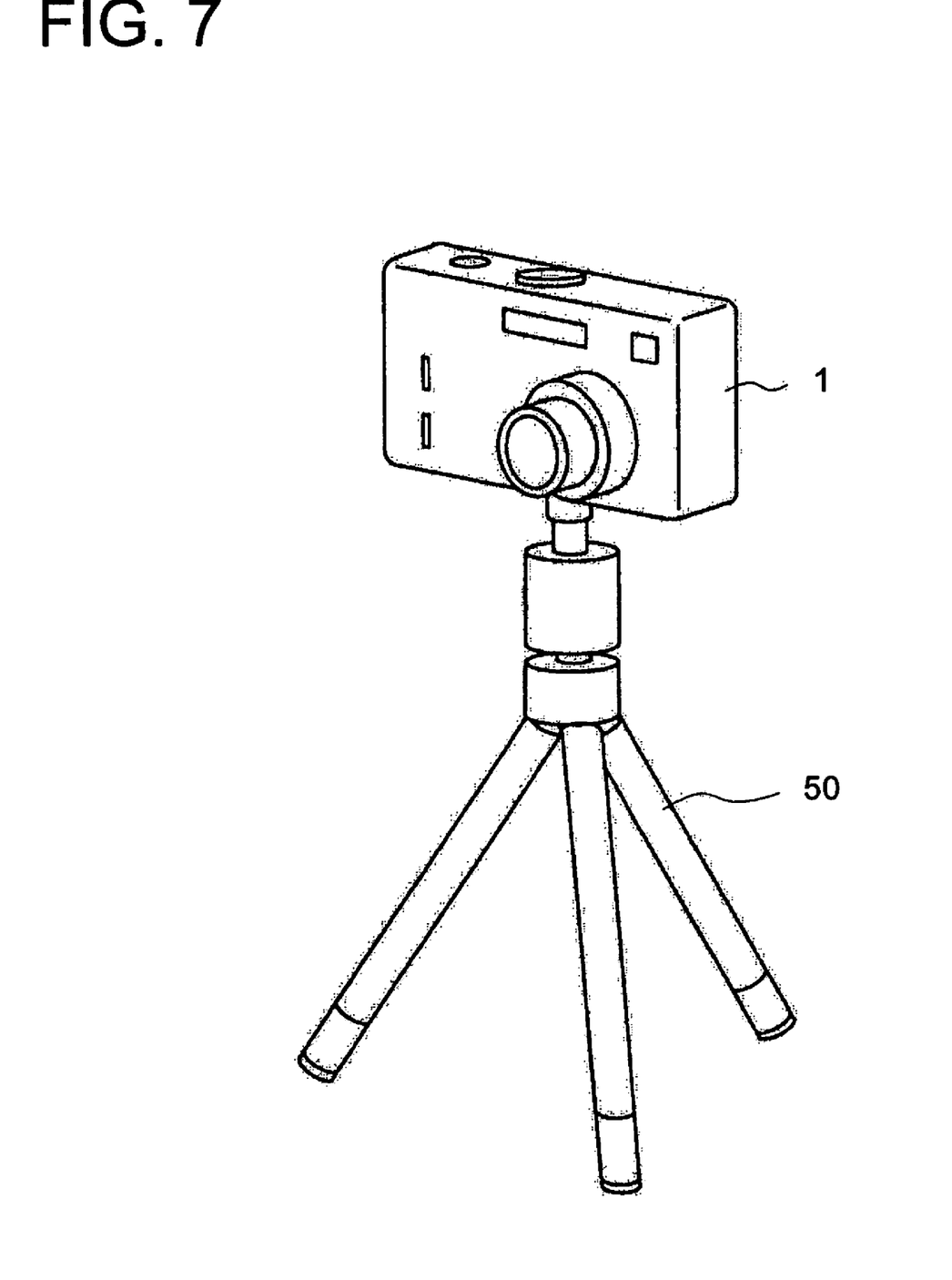
FIG. 7 shows the image-taking apparatus which is the first embodiment of the present invention to which a tripod is attached.

A through screw hole portion 10a (female screw hole portion) is formed in substantially the center of the mounting member 10 and a male screw portion provided on a tripod 50 is screwed into this screw hole portion 10a. Four screw hole portions 10b into which screws (not shown) are fitted are formed on the top face of the mounting member 10 around the screw hole portion 10a.

The main chassis 11 is provided with bent sections 11g (first surface) and 11f (second surface) to mount the mounting member 10. The bent section 11g is provided with four screw stoppers 11h (one is not shown) corresponding to the screw hole portions 10b of the mounting member 10. A screw stopper 11i corresponding to the screw hole portion (screw hole portion different from the screw hole portion 10b) provided in the mounting member 10 is formed at the right end of the bent section 11f in FIG. 6.

The main chassis 11 is made of a zinc-coated steel sheet having a thickness (d2) of approximately 0.5 mm.

A top plate 20 (second member) having substantially the same shape as the bent section 11g is sandwiched between the mounting member 10 and bent section 11g and this top plate 20 is provided with four hole portions 20a (corresponding to the screw hole portions 10b) to let screws (not shown) pass. The top plate 20 is made of a SUS material having a thickness (d1) of approximately 0.6 mm.

Here, when the male screw portion of the tripod 50 is screwed into the screw hole portion 10a, the contact part with which the tip of the male screw portion contacts must be reinforced. There are tripods, the length of the male screw portion of which is freely adjustable and when the user has mistakenly adjusted the length of the male screw portion so as to exceed the length of the screw hole portion 10a, the male screw portion may deform the contact part when the male screw portion is screwed into the screw hole portion 10a. When the contact part is deformed, the parts arranged inside the camera may be damaged.

In this embodiment, one end of the screw hole portion 10a (opening opposite to the insertion side of the male screw portion) is covered with the top plate 20 made of a SUS material having higher mechanical strength than the material of the main chassis 11 so that the tip of the male screw portion touches the top plate 20.

In this way, even if the tip of the male screw portion touches the top plate 20, it is possible to prevent the top plate 20 from being deformed or prevent the parts inside the camera from being damaged.

Here, securing the contacting strength of the male screw portion of the tripod 50 through only the main chassis 11 (bent sections 11g) without using the top plate 20 requires the thickness of the main chassis 11 to be set to approximately 1.1 mm even through a simple calculation (when the main chassis 11 is made of a SUS material which is the material of the top plate 20). Since the main chassis 11 is actually made of a zinc-coated steel sheet having a lower mechanical strength than the SUS material, a thickness of 1.1 mm or greater is required.

Since this embodiment uses the top plate 20 to secure the contacting strength of the male screw portion, it is possible to reduce the thickness of the main chassis 11 (bent section 11g). Here, the sum total of the thickness of the top plate 20

(d1=0.6) and the thickness of the main chassis 11 (bent section 11g) (d2=0.5) is smaller than that when the thickness of the main chassis 11 is increased without using the top plate 20 (thickness is 1.1 mm or more), and therefore it is possible to reduce the size and weight of the camera 1 (reduction in size in the vertical direction of the camera 1).

Furthermore, since this embodiment covers one end of the screw hole portion 10a with the top plate 20 made of a SUS material, it is possible to hide the main chassis 11 from the outside of the camera 1 (through the screw hole portion 10a).

Since the main chassis 11 is made of a zinc-coated steel sheet, with the structure whereby the main chassis 11 is visible from the outside of the camera 1 through the screw hole portion 10a, the camera 1 is not good-looking. Thus, by making the top plate 20 made of a SUS material visible from the outside through the screw hole portion 10a, it is possible to make the camera 1 better looking than when the main chassis 11 is exposed.

On the other hand, with the structure not using the top plate 20, when a pinhole is formed in the exposed part of the main chassis 11 made of the zinc-coated steel sheet, rust may be generated because of aging of this part. This embodiment covers the exposed part with the top plate 20 made of the SUS material as described above, and therefore it is possible to reduce generation of rust compared to the zinc-coated steel sheet and also prevent the strength of the top plate 20 from reducing due to rust.

Furthermore, this embodiment has the screw hole portion 10a penetrating the mounting member 10, and can thereby facilitate machining when the screw hole portion 10a is formed through tapping. This drastically reduces the machining tact time and contributes to a cost reduction.

Furthermore, the screw hole portion 10a formed by applying tapping to the hole penetrating the mounting member 10 is all structured as a complete screw hole portion (no incomplete screw hole portion exists). This eliminates the need to provide a protrusion to prevent the male screw portion of the tripod 50 from going into the incomplete screw hole portion and thereby reduce the thickness (thickness in the direction indicated by arrow C in FIG. 1) of the mounting member 10.

To fix the mounting member 10 to the main chassis 11, a method of directly fixing the side of the mounting member 10 to the main chassis 11 without providing the bent sections 11g and 11f.

However, in this method, no bent section 11g exists and a collision of the male screw portion of the tripod 50 is only supported by the top plate 20 alone, and therefore it is necessary to increase the thickness of the top plate 20. This may narrow the internal volume of the camera and cause the size of the camera to increase.

Furthermore, since the top plate 20 needs to be fixed to the mounting member 10 firmly, four or more screws need to be used.

Furthermore, when external stress such as torsion is applied to the camera to which the tripod 50 is attached, it is known from experiments that fixing the side of the mounting member 10 to the bent section 11g through the top plate 20 allows the mounting member 10 to be fixed to the main chassis 11 more firmly than directly fixing the side of the mounting member 10 to the main chassis 11.

Embodiment 2

Figure 8:
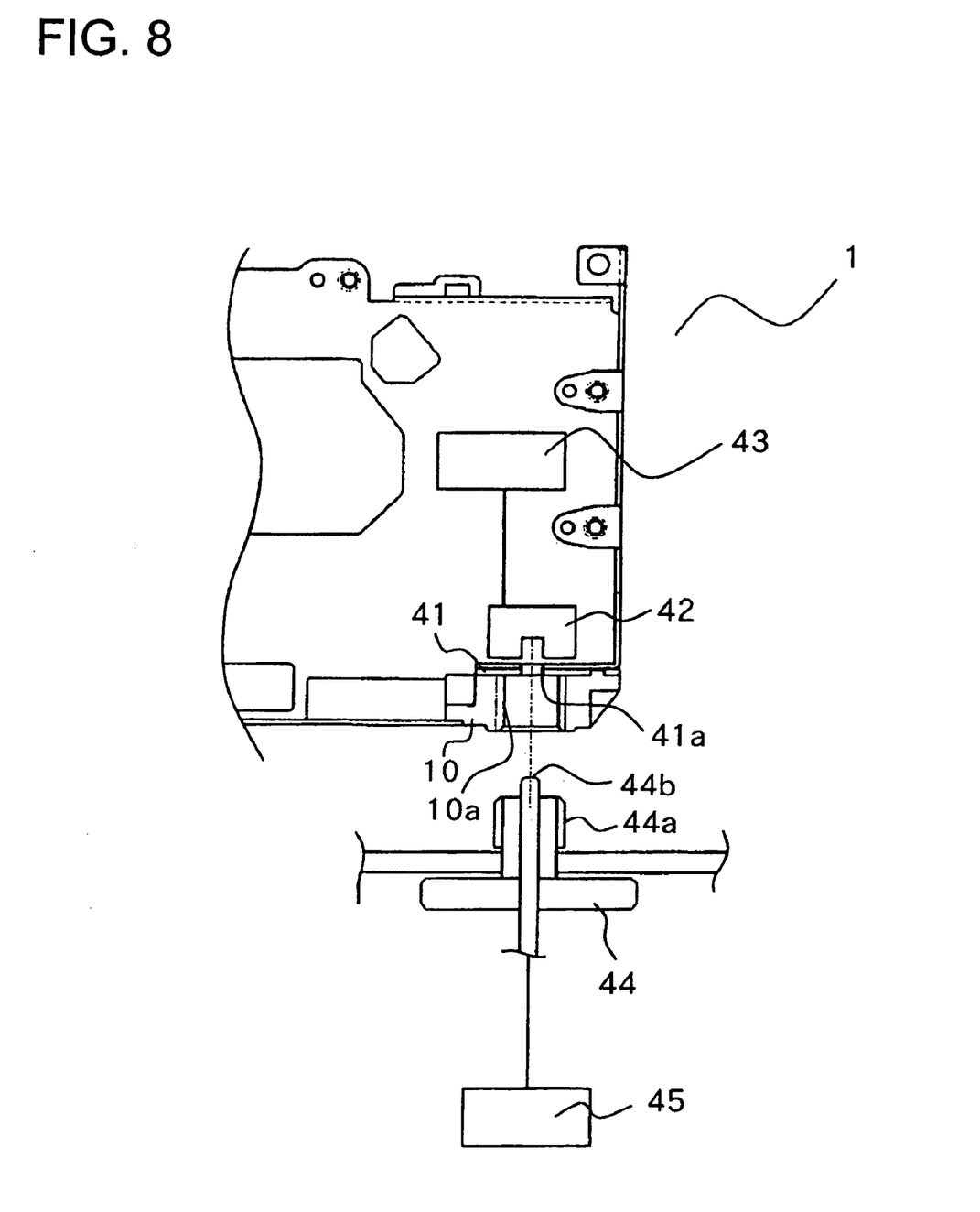
FIG. 8 is a schematic cross-sectional view illustrating a connection between a camera which is a second embodiment of the present invention and an accessory.

A camera which is Embodiment 2 of the present invention will be explained using FIG. 8. The same members as those explained in Embodiment 1 will be assigned the same reference numerals and explanations thereof will be omitted.

A hole portion 41a (second hole portion) which penetrates a top plate 41 is provided in substantially the center of the top plate 41 to let pass an optical fiber 44b, which will be described later.

A signal detection section 42 is provided in a camera 1 and this signal detection section 42 is connected to a CPU 43 in the camera 1.

Reference numeral 44 denotes a mounting section provided in an accessory, which will be described later, and this mounting section 44 is provided with a male screw portion 44a which engages with a screw hole portion 10a. An optical fiber 44b as a communication contact is placed in substantially the center of the mounting section 44 in such a way as to extend in the vertical direction in the figure. One end of this optical fiber 44b is connected to a CPU 45 in the accessory and the other end protrudes from the tip of the male screw portion 44a. The communication contact is not limited to the optical fiber 44b but may be of an electrical contact type, for example.

When the above described accessory is an external electronic flash, by attaching the male screw portion 44a provided in the electronic flash to the screw hole portion 10a in a mounting member 10, the CPU 43 of the camera 1 is connected to the CPU 45 of the electronic flash so as to be able to communicate with each other.

That is, when the male screw portion 44a of the electronic flash is engaged with the screw hole portion 10a, the optical fiber 44b which protrudes from the tip of the male screw portion 44a penetrates through the hole portion 41a of the top plate 41 to touch the signal detection section 42 and thereby allow the camera 1 to communicate with the electronic flash.

In the above described structure, the CPU 43 can prohibit the electronic flash built in the camera 1 from emitting light or transmit control signals such as start or stop of light emission to the CPU 45 of the external electronic flash through the optical fiber 44b. That is, when the external electronic flash has a higher guide number than that of the built-in electronic flash of the camera 1, it is possible to prohibit light emission of the built-in electronic flash and give priority to light emission of the external electronic flash.

According to the conventional technology, when an electronic flash is externally mounted on (the top of) the camera 1, the thickness of the part peripheral to the mounting part must be increased, which increases the size of the camera 1.

As explained in Embodiment 1, this embodiment attaches the external electronic flash to the mounting member 10 which has almost no possibility of producing any above described strength-related problems, which eliminates the need to increase the thickness of the part to which the external electronic flash is attached, and can thereby reduce the size of the camera 1.

On the other hand, when the above described accessory is a remote controlled reception section, by engaging the male screw portion 44a formed in the remote controlled reception section with the screw hole portion 10a of the camera 1, it is possible to connect the CPU 43 of the camera 1 and the CPU 45 of the remote controlled reception section so as to be able to communicate with each other.

In the above described structure, when, for example, the camera 1 is set to an image-taking mode, a release signal output from a remote control (not shown) is received by the remote controlled reception section and this received signal is transmitted to the camera 1 (CPU 43) through the optical fiber 44b, and therefore it is possible to perform a release operation by remote control.

Furthermore, when the camera 1 is set to a reproduction mode, the remote controlled reception section receives a reproduction operation signal for such as a frame advance and slide show and this received signal is transmitted to the camera 1 (CPU 43) through the optical fiber 44b, and therefore it is possible to perform various types of reproduction operation by remote control.

According to this embodiment, the remote controlled reception section can be placed outside the camera 1, and it is thereby possible to reduce the size of the camera 1 compared to the case where the remote controlled reception section is placed inside the camera 1.

The foregoing embodiments have described the digital still camera, but the present invention is also applicable to an image-taking apparatus such as a digital video camera and silver-salt film camera, etc.

As has been explained so far, according to this embodiment, the male screw portion inserted into the screw hole portion is blocked by a receiving member to prevent it from being inserted more than a predetermined amount, and therefore there is almost no possibility that the main chassis may be deformed by receiving a force from the male screw portion. Therefore, by reducing the thickness of the main chassis, it is possible to reduce the size and weight of the image-taking apparatus.

Furthermore, the screw hole portion formed in the mounting member is of a through hole type, and therefore there is no need to provide a protrusion or ceiling section for the mounting member as in the case of the conventional example. Therefore, it is possible to reduce the thickness of the mounting member and reduce the size and weight of the image-taking apparatus.

The mounting member is fixed to the first surface through the receiving member and also fixed to the second surface, and it is thereby firmly fixed to the main chassis. Therefore, when an accessory is attached to the mounting member, it is possible to reduce the possibility that load may be applied to the mounting member, loosening its mounting on the main chassis.

Furthermore, a reception member is attached to the first surface to prevent the male screw portion from contacting the first surface. In this way, it is possible to make the thickness of the first plane equal to the thickness of the rest of the main chassis.

While preferred embodiments have been described, it is to be understood that modification and variation of the present invention may be made without departing from scope of the following claims.

What is claimed is:

1. An image-taking apparatus capable of mounting an accessory, comprising:
   a first member having a female screw hole portion into which a male screw portion provided in the accessory is inserted, the female screw hole portion being a hole portion penetrating the first member;
   a main chassis of the image-taking apparatus to which the first member is fixed and which has a surface for mounting the first member; and
   a second member which covers an opening of the female screw hole portion opposite to the insertion side of the male screw portion and which is arranaed between the first member and the surface of the main chassis,
   wherein the second member prevents the male screw portion from further going in by a tip of the male screw portion inserted into the female screw hole portion contacting the second member.

2. The image-taking apparatus according to claim 1, wherein the thickness of the second member is greater than the thickness of the main chassis.

3. The image-taking apparatus according to claim 1, wherein the second member is made of a material having higher mechanical strength than the material of the first member.

4. The image-taking apparatus according to claim 1, wherein the image-taking apparatus is connected to the accessory through a connection member so as to be able to communicate therewith, and
   the second member comprises a second hole portion to let pass the connection member.

5. The image-taking apparatus according to claim 1, capable of mounting a tripod as the accessory.

* * * * *

UNITED STATES PATENT AND TRADEMARK OFFICE
CERTIFICATE OF CORRECTION

| | |
|---|---|
| PATENT NO. | : 7,090,415 B2 |
| APPLICATION NO. | : 11/287909 |
| DATED | : August 15, 2006 |
| INVENTOR(S) | : Kazuto Ariga |

It is certified that error appears in the above-identified patent and that said Letters Patent is hereby corrected as shown below:

Column 10, line 21, delete "is arranaed" and insert --is arranged--

Signed and Sealed this

Twenty-first Day of November, 2006

JON W. DUDAS
*Director of the United States Patent and Trademark Office*